Dec. 22, 1936.  P. DUGELAY  2,065,062
VALVE FOR HIGH SPEED COMPRESSORS
Filed July 2, 1931  2 Sheets-Sheet 1
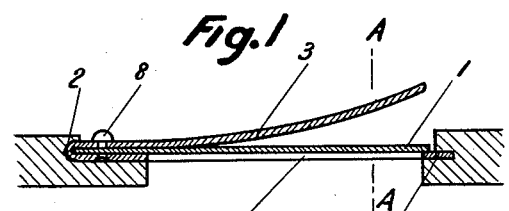
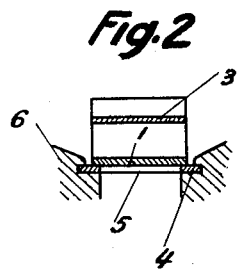
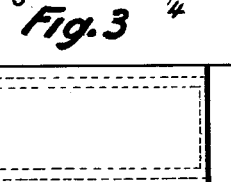
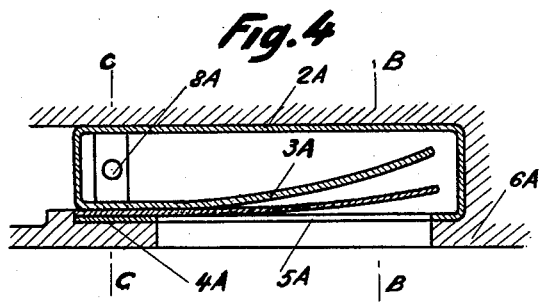
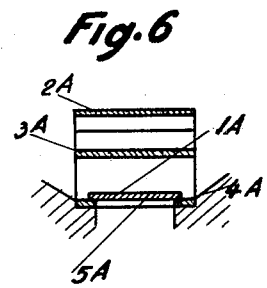
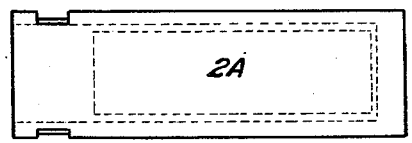
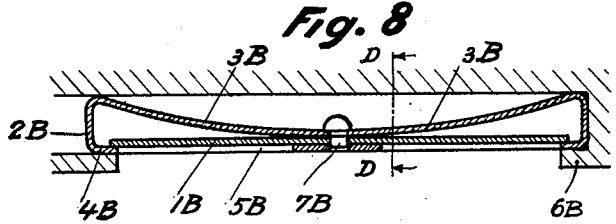
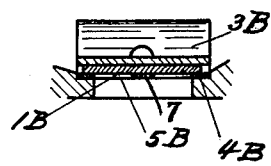
PAUL DUGELAY
INVENTOR
BY [signature]
ATTORNEY Dec. 22, 1936.   P. DUGELAY   2,065,062
VALVE FOR HIGH SPEED COMPRESSORS
Filed July 2, 1931   2 Sheets-Sheet 2
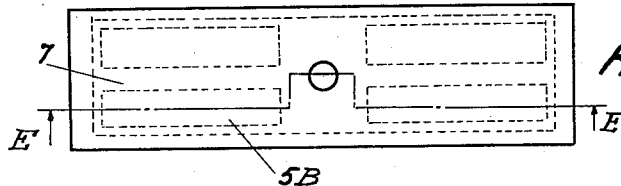
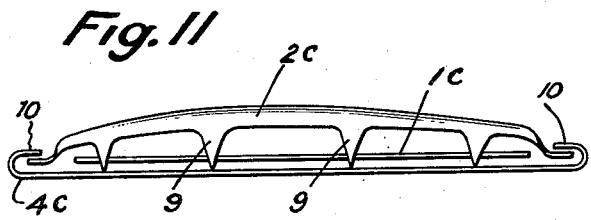
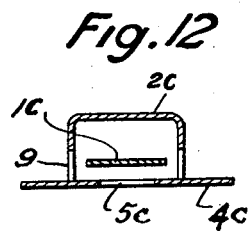
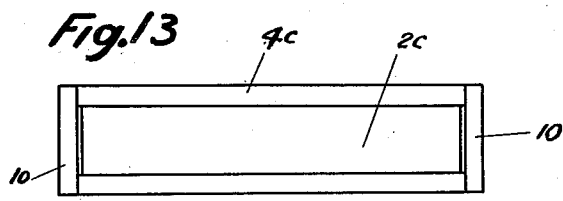
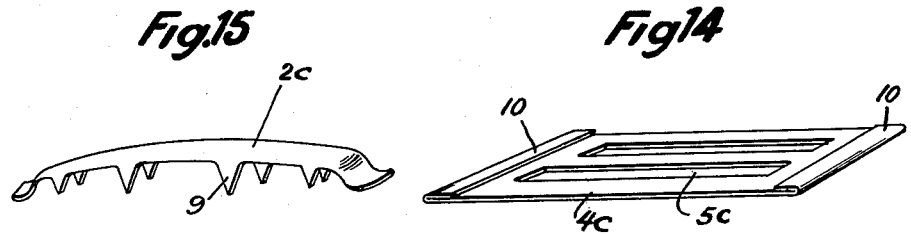
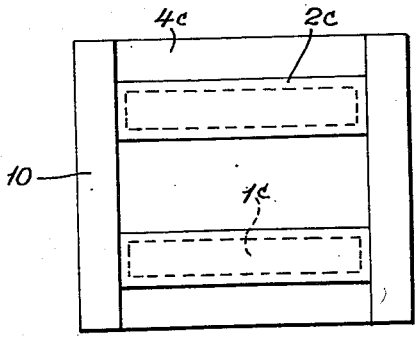
PAUL DUGELAY~
INVENTOR
BY
ATTORNEY Patented Dec. 22, 1936

2,065,062

UNITED STATES PATENT OFFICE 2,065,062

VALVE FOR HIGH SPEED COMPRESSORS

Paul Dugelay, Paris, France, assignor to Société d'Exploitation de Brevets pour l'Industrie l'Aviation et l'Automobile (Sebia), Paris, France, a corporation of France Application July 2, 1931, Serial No. 548,340
In France July 9, 1930

4 Claims. (Cl. 277—60)

The present invention relates to compressors and has for its object improvements enabling on the one hand the speed of operation thereof to be increased, and on the other hand a relatively light form of construction of the component parts thereof.

It is known to provide high speed compressors with inlet and exhaust valves formed of flexible plates, the movements of which may be controlled in accordance with the invention described in the pending application No. 508,885. The satisfactory construction of these valves is somewhat difficult and this difficulty is increased when the speed of the compressor is high, and when, consequently, the backward and forward movements of the valve lamellae become extremely rapid. This difficulty arises from the fact that under these conditions several requirements are imposed on the valves which are more or less incompatible with one another; the valves must be extremely sensitive, the mass of the valves and their movement must be as small as possible, and at the same time it is necessary that the sections of the lamellae be sufficient to ensure a minimum loss of charge when operating at the highest speed. In addition the valves must possess a maximum resistance to shocks and fatigue.

Steel is preferably employed for the construction of the valves, but nevertheless in known forms of compressors the seats of the valves are formed by part of the metal walls of the body of the compressor which renders the employment of relatively light metals for the construction of these walls impossible in view of the fact that the flexible valve lamellae of steel could not make a sufficiently tight joint on seats formed of these metals.

The present invention provides a simple construction of valves which respond to all the conditions above mentioned, and the fitting of a relatively large number of valves of comparatively extremely small weight.

A valve assembly constructed in accordance with this invention comprises a housing of sheet metal with one or more valves of lamella form arranged therein. The housing may be constructed from one or more parts and the valve lamellae may be mounted so as to be fixed at one extremity or so as to be free to move at both extremities.

In the case where the valve lamellae are fixed at one end, the housing may be constructed in the form of a detachable flexible holder of steel comprising a false valve seat and a device for anchoring the valve lamella thereto, the valve being arranged to move back into a normal position, thus ensuring a tight joint under favorable conditions.

The valves, according to the invention, are individually of relatively small dimensions, but a plurality thereof may be employed so as to provide comparatively very large passage areas with negligible losses of charge.

The valve lamella is arranged to flex as it opens on to a curved stop formed by part of the detachable housing, and unrolls to move progressively off the stop on to the false seat, which may be of either straight or curved configuration.

The valve lamella when at rest may be arranged to be either straight or curved, dependent upon whether it is to be normally in the closed or open position. The latter arrangement is particularly advantageous in respect of suction valves where the elastic reaction of the lamella causes, in certain cases, a delay in the closing of the valve, which latter is effected by the pressure of air or other gases.

Each valve lamella may be in the form of a single blade or several superposed blades and the thickness thereof is determined so that the movement thereof out to the stop is progressive, whilst sufficient sensitiveness is provided to avoid shocks between the valve lamella and the stop.

The false seat of steel on which the flexible valve lamella makes a tight joint without bearing directly on the support forming a part of the compressor wall, may be provided with a single orifice or a plurality thereof, and in the latter case forms a kind of grid, the external frame of which rests on the supporting walls of the compressor, and the grid of which supports the valve lamella or lamellae under the influence of the gaseous pressures.

The housings may be constructed in two parts, so that the parts may be separated to permit the removal and replacement of the valve lamellae. The two parts are preferably in the form of stampings and may be of considerably varied shapes. According to certain preferred methods of construction, more fully described below, upright members on the side of the housing and a curved contour of the interior of the housing are provided so that the stop for the valve lamella produces certain guiding and damping features.

The invention also refers to constructions in which the two types of valve lamellae described above are arranged to co-operate with outlet openings formed in the walls of the cylinder. This has the advantage that a maximum delivery of air corresponding to the maximum speed of the piston and a minimum delivery of air corresponding to the minimum speed of the piston is obtained.

The valve lamellae may be arranged in different ways, but are preferably disposed on lines parallel to the upper surface of the piston of the compressor.

In order that the invention may be fully understood reference is directed to the accompanying drawings in which:—

Figure 1 illustrates in longitudinal section a valve assembly constructed in accordance with this invention and mounted in a position on the compressor cylinder, parts only of which are illustrated.

Figure 2 is a section on the line A—A of Figure 1.

Figure 3 is a plan of the assembly illustrated in Figure 1.

Figure 4 is a view similar to Figure 1 illustrating a modified construction of valve assembly in accordance with this invention.

Figure 5 is a plan of the assembly illustrated in Figure 4.

Figure 6 is a section on the line B—B of Figure 4.

Figure 7 is a section taken on a line corresponding to C—C of Figure 4.

Figures 8, 9, and 10 are views similarly arranged to Figures 1, 2, and 3 showing a further modification of valve assembly in accordance with the invention, Figure 8 being a longitudinal section on line E—E of the structure illustrated in a plan view in Figure 10, while Figure 9 is a transverse section of Figure 8 on line D—D.

Figures 11, 12, and 13 are views similar to Figures 1, 2, and 3 of a still further modified construction of valve assembly in accordance with this invention.

Figure 12 represents a transverse section of Figure 11 taken between the projections 9 of Figure 11, showing openings therein.

Figures 14 and 15 illustrate details in perspective of two elements of the assembly illustrated in Figures 11 to 13, and Figure 16 is a plan view of an element of Figure 14 assembled with two elements made according to Figure 15 and containing lamellae indicated in dotted lines within the same.

Like parts are indicated throughout the drawings by the same reference figures and it is to be understood that the drawings illustrate examples only of constructions of valve assemblies in accordance with the invention.

Referring to Figures 1 to 3, a flat, flexible valve lamella 1 is secured by means of rivets 8 in the fold of a turned-over gripping portion 2 of a housing formed of sheet steel and which is provided with an upwardly curved stop 3 and a false valve seat 4 in which an opening 5 is formed. The valve assembly is fixed in a slide 6 which forms part of the compressor body and which is preferably constructed from a relatively light metal; for example, magnesium or aluminium alloy.

The slide may also be provided in the cylinder wall of the compressor.

Referring to Figures 4, 5, 6, and 7, a flexible, curved valve lamella 1A is mounted in a flexible steel housing 2A, which is provided with a curved stop 3A for the valve 1A, and the curvature of which is greater than the normal curvature of the lamella 1A. A false seat 4A having an opening 5A is provided for the valve and the housing is mounted upon a portion 6A of the compressor body in a similar manner to that of the preceding example.

The normal position of rest of the lamella 1A corresponds to the open position of the valve. Although the drawings illustrate the lamella 1A as being curved and the false seat 4A flat, it is to be understood that the lamella 1A may be flat and the false seat 4A curved. Also the lamella 1A and the false seat 4A may both be curved without departing from the spirit of the invention. The rivet 8A holds the parts in an assembled unit as before.

Referring to Figures 8, 9, and 10, a valve assembly is illustrated which comprises a flexible, flat valve lamella 1B mounted in a housing 2B of flexible steel which is provided with a double curved stop 3B for the valve and a false seat 4B on a wall 6B in the form of a grid having a plurality of orifices 5B. Bars 7 of the grid serve to support the valve lamella against gaseous pressures.

Referring to Figures 11, 12, and 13, a valve assembly is illustrated in which a flexible valve lamella 1C is confined within a housing 2C which is mounted upon a flat perforated plate in the form of a frame 4C. The frame having the apertures 5C acts as a seat for the lamella when in the closed position. The housing 2C is curved in conformity with the desired profile and projections such as 9 curve downwardly at the sides and serve as guides for the lamella 1C, whilst ensuring relatively wide openings for the flow of gases. The lateral walls of the housing 2C are solid for a certain distance from the curved portion from which the projections 9 extend (Figure 12), so that the movement of the valve lamella toward the curved portion is damped to a certain extent by the gases trapped between the lamella and the said housing. Edges of the seat 4C are provided with turned-over portions 10—10 under which the flat extremities of the housing 2C are arranged to engage. The assembly formed by the elements described presents, in addition to those already mentioned, certain advantages such, for example, as the ready and economical manufacture of the elements by stamping; the frame 4C forming the seat of the blade may be made of metal having a greater resistance to wear, whilst the part 2C forming the housing may be of softer, lighter, or less expensive metal; and the ease in dismantling the two parts enclosing the valve lamella for the purpose of replacing the same.

This method of construction also enables multiple element valves to be produced. To this end, a number of apertures are formed in the frame constituting the seat, corresponding to the number of valve lamellae to be employed. Figure 14 illustrates in perspective a valve seat of this character for two valve elements. The desired number of housings, such as that illustrated in Figure 15, are slid on to the seat by engagement with turned over edges above described. In Figure 16 we have a plan view of the element 4C shown in Figure 14 and assembled with two elements similar to element 2C shown in Figure 15, while within the same two lamellae 1C are indicated in dotted lines.

The detachable valves may with advantage be arranged around the lateral walls of the compressor cylinder, and a series of such valves may be provided arranged in succession from the end of the cylinder. This arrangement offers two principal advantages; firstly, that of increasing the passage area for the gases during suction and delivery, the maximum total section utilizable being considerably greater than when it is limited to that of the end of the cylinder; and, secondly, as the piston covers the valve openings progressively as it approaches the end of the cylinder, the passage area is diminished in proportion to the speed of the piston which is a favorable condition for adiabatic working.

It is understood that the invention is not limited to the examples described, but is capable of numerous variations which could be evolved by experts, in particular as regards the shape of the housings, the number of valve lamellae, the stops therefor, the number of the valve openings, the curvature of the stops and the valve lamellae, and the configuration of the lamellae.

I claim:—

1. A valve assembly for high speed compressors, comprising in combination a seat member in the form of a perforated flat plate, at least two edges of which are turned over, a sheet metal member provided with flat ends adapted to be slid under the turned over edges of said plate, and at least one valve lamella mounted between said seat member and the said sheet metal member so as to cover the perforations in said seat member.

2. A valve assembly for high speed compressors, comprising in combination a seat member formed of wear resisting metal and constructed as a flat perforated plate, at least two edges of which are turned over, a member formed of soft, light sheet metal comprising flat extremities adapted to be slid under the turned over edges of said seat member, and at least one valve lamella arranged between said seat and the said sheet metal member, so as to cover the perforations in said seat member.

3. A valve assembly for high speed compressors, comprising in combination at least one valve lamella, a seat member having an orifice formed therein adapted to be closed by said lamella, and a sheet metal member forming a housing with said seat member, said housing surrounding said lamella and of which part of the lateral walls are solid remote from said seat, apertures being formed in said walls by means of projections on the solid part of the lateral walls extending down at the sides of the housing.

4. A valve assembly for high speed compressors, comprising in combination a plurality of valve lamellae, a sheet metal seat member in the form of a grid of which the orifices are adapted to be closed by said lamellae, a plurality of sheet metal members each detachably mounted on said seat member and each of the said members forming with a part of the seat member a housing in which at least one of said lamellae is enclosed.

PAUL DUGELAY.